UNITED STATES PATENT OFFICE.

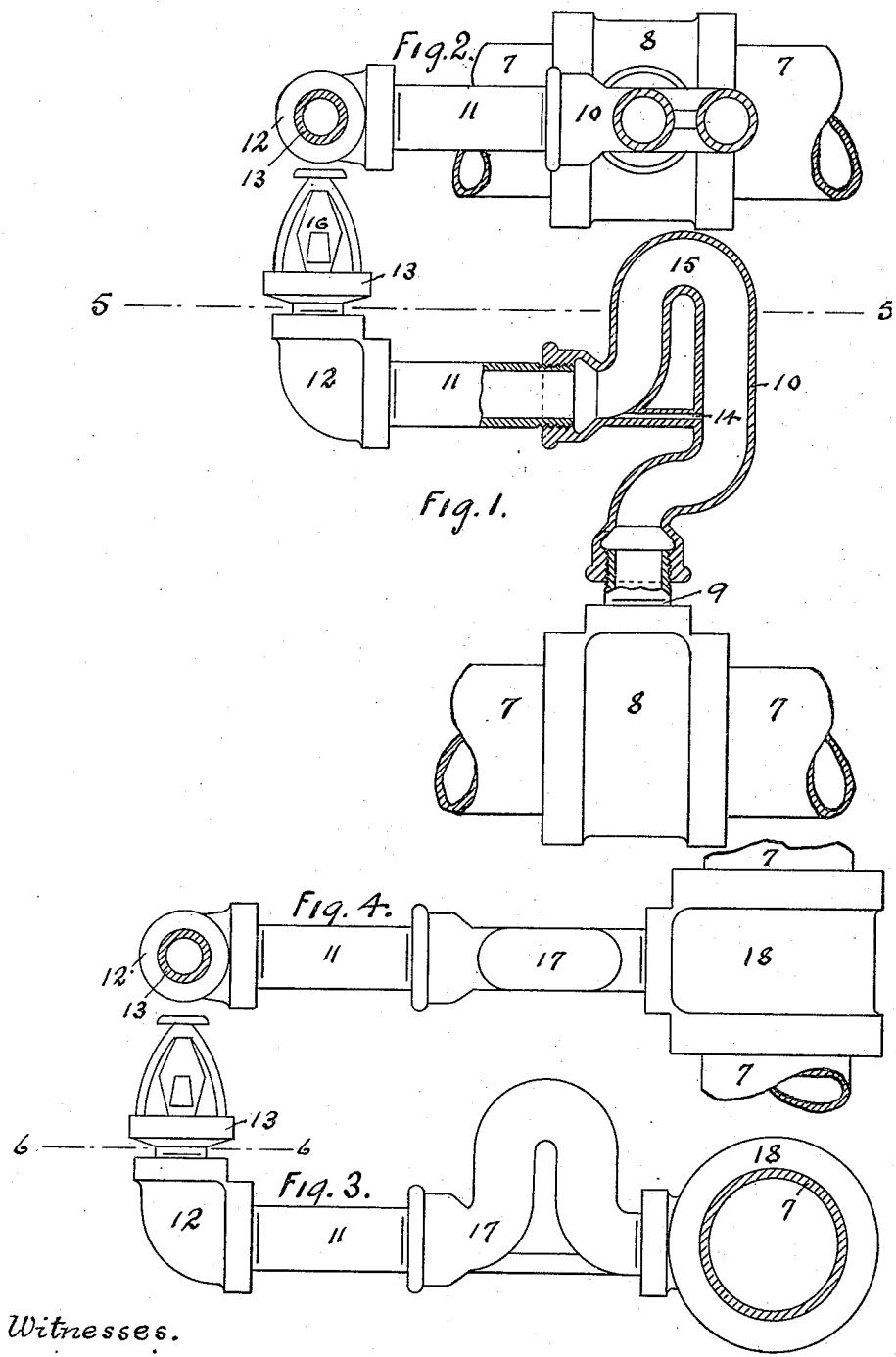

WILLIS K. HODGMAN, OF TAUNTON, MASSACHUSETTS.

COMBINED WATER-HEATING AND SPRINKLER SYSTEM.

1,203,738.

Specification of Letters Patent.

Patented Nov. 7, 1916.

Application filed March 4, 1916. Serial No. 82,224.

*To all whom it may concern:*

Be it known that I, WILLIS K. HODGMAN, a citizen of the United States, residing at Taunton, in the county of Bristol and State of Massachusetts, have invented new and useful Improvements in Combined Water-Heating and Sprinkler Systems, of which the following is a specification.

My invention relates to combined water-heating and sprinkler systems wherein by means of a single system of piping, water is provided for both heating and fire extinguishing purposes. In these combined water-heating and sprinkler systems some common and usual form of automatic sprinkler-head is used to release the water in case of fire and in order to protect the sprinkler-heads from being set off by the heat from the hot water in the circulation pipes, they are located at the outer or dead ends of peculiar short pipes, commonly called offsets, which branch out from the circulation pipes.

Prior to my invention there were two types of offsets in practical use; the curved or "ram's horn" offset and an upwardly and laterally branching form of offset having a relatively long horizontal part terminating in the dead end. The ram's horn offset takes out from the side of the circulation pipe, curves down to a point below and then curves up to a point above the circulation pipe. This forms a water trap below the circulation pipe through which, it is claimed, and I have verified the claim by experimentation, but little heat is transmitted to the sprinkler-head. The ram's horn offset is undesirable, however, because it prevents complete drainage of the system.

The other form of offset is effective when filled or partly filled with air, but when on account of the imperceptible leakage of air at a sprinkler-head, which is apt to happen, the off-set becomes solidly full of water I have found by experimentation that sufficient circulation is set up in the offset to raise the temperature of the sprinkler-head to a degree far beyond safety.

The object of my invention is the production of an offset for combined water-heating and sprinkler systems which will be effective and satisfactory under all conditions and free from the undesirable features of both the offsets mentioned. I attain this object by the apparatus illustrated in the accompanying drawing, in which—

Figure 1, is a view of a portion of a combined water-heating and sprinkler system, embodying my invention, partly in elevation and partly in cross section; Fig. 2, is a top view of Fig. 1, partly in cross section on line 5—5; Fig. 3 shows another embodiment of my invention, in elevation; and Fig. 4 is a top view of Fig. 3, with sprinkler-head cut off on line 6—6.

Similar numerals refer to similar parts throughout the several views.

Referring to Figs. 1 and 2, I have there shown two sections 7 of a hot water circulation pipe joined by a T 8 to which a close nipple 9 secures a suitable trap 10. This trap may be formed as shown of a section of pipe looped upwardly and providing passage for conducting fluid successively in generally opposite directions first upwardly and then downwardly to a chamber herein formed by a nipple 11 to the end of which I have shown the elbow 12 securing a sprinkler head 13. The head shown in the drawings is of the standard and well known Grinnell type. A small by-pass 14, about 1/16" in diameter in practice, opens adjacent the bottom of the chamber and opens near the intake end of the trap 10, acting as a shunt for the passage therethrough. This by-pass also serves to drain any water from the chamber 11 into the pipe 7 when the system is emptied.

It is apparent that if there is a minute leakage of air from the offset through the sprinkler head that water from the pipe 7 will seep through the by-pass 14, gradually filling the chamber 11 and, entering the trap from either side, will form an air seal at 15 thus closing the main passage through the offset against circulation of water. There will then be a body of water in the chamber 11 isolated from that of the pipe except through the by-pass 14 which is of such small dimension that it substantially prevents circulation of the water and keeps it from raising the temperature of the sprinkler head 13 to a dangerous point. It will be understood that if the sprinkler head is released by fire, water will be supplied thereto through the main passage of the offset through the trap 10.

I have proved by experimentation that the amount of heat transmitted through my offset to a sprinkler-head is at all times negligible and that even when filled with water, excepting the air chamber 15, the fusible strut 16 of the sprinkler-head 13 reaches a temperature of but 90° F. with the water in the circulation pipe at 254°. As a temperature of 220° is recommended as a maximum for the water in the circulation pipes, it is evident that the factor of safety in my offset is ample.

In Figs. 3 and 4 a modified offset is shown with the trap 17 taken out direct from the side of the T 18 while the rest of the parts are relatively associated as are similar parts already described.

It is obvious that the trap 17 could be taken out of the side or end of a pipe of the same size as the pipe beyond the trap without losing any of its advantages. It is also obvious that either of the traps 10 or 17 could be used in any hot water circulating system, at any point where it was desired to take off a branch pipe, to substantially stop the water from circulating and to control it, in the branch pipe, at a temperature considerably less than that of the water in the circulation pipes.

I have shown and described my new offset as made up of several parts, but it is evident that it could be made integral.

I claim:

1. The combination in a combined circulatory water heating and sprinkler system, of a pipe for the circulation of heating water, a branch pipe in communication with the circulation pipe having an outlet normally closed by a sprinkler head, said branch pipe comprising a fluid conducting passage arranged to conduct fluid successively upwardly and downwardly to said head and a by-pass of relatively small dimension connecting the ends of said passage to shunt fluid flow therefrom and admitting fluid to both ends of the passage to form an air seal therein.

2. The combination in a combined circulatory water heating and sprinkler system, of a pipe for the circulation of heating water, a branch pipe in communication with the circulation pipe, an outlet therefrom normally closed by a sprinkler head, said branch pipe including a trap intermediate the ends thereof providing an air chamber, said trap having an intake from the circulation pipe and an outlet leading to said sprinkler head, and means providing for fluid seepage between the intake to and outlet from said trap.

3. The combination in a combined circulatory water heating and sprinkler system, of a pipe for the circulation of heating water, an offset in communication with the circulation pipe terminating in a dead end and having a sprinkler head attached to said dead end, said offset providing a chamber adjacent said sprinkler head and communications from said pipe to said chamber including a passage of relatively large dimension leading circuitously to said chamber by a path extending above the level of the same and of said circulation pipe and also including a seepage passage opening to said chamber from the intake end of said large passage.

4. The combination in a combined circulatory water heating and sprinkler system, of a pipe for the circulation of heating water, an offset in communication with the circulation pipe terminating in a dead end and having a sprinkler head attached to said dead end, said offset providing a chamber adjacent said sprinkler head and communications from said pipe to said chamber including a passage of relatively large dimension leading circuitously to said chamber by a path extending above the level of the same and of said circulation pipe and also including a seepage passage opening to said chamber adjacent the bottom thereof and to the intake end of said large passage whereby it will serve to drain the said chamber.

5. The combination in a combined circulatory water heating and sprinkler system, of a pipe for the circulation of heating water, an offset in communication with the circulation pipe terminating in a dead end and having a sprinkler head attached to said dead end, said offset providing a chamber 11 adjacent the sprinkler head and an upwardly looped passage 10 to the chamber from the pipe and means 14 permitting seepage of water from the circulation pipe to said chamber upon gradual escape of air therefrom, the entrance of water to said chamber acting to close the main fluid passage through said offset and preventing transmission of heat to the sprinkler head by convective fluid movement.

6. The combination in a combined circulatory water heating and sprinkler system, of a pipe for the circulation of heating water, an offset in communication with the circulation pipe terminating in a dead end and having a sprinkler head attached to said dead end, said offset providing a chamber 11 adjacent the sprinkler head and an upwardly looped passage 10 to the chamber from the pipe and combined drainage and feeding means 14 including a passage opening adjacent the bottom of said chamber and permitting seepage of water from the circulation pipe thereto upon gradual escape of air therefrom, the entrance of water to said chamber acting to close the main fluid passage thereto through said offset.

7. The combination in a combined circulatory water heating and sprinkling system, of a pipe for the circulation of heating water, an offset in communication with the circulation pipe terminating in a dead end and having a sprinkler head attached to said dead end, said offset having an upwardly extending loop and a by-pass of small dimension bridging the legs of said loop.

WILLIS K. HODGMAN.

Witnesses:
    JOHN J. BARKER,
    FRED S. DUNBAR.

Copies of this patent may be obtained for five cents each, by addressing the "Commissioner of Patents, Washington, D. C."